United States Patent [19]

Taylor

[11] 4,035,535

[45] July 12, 1977

[54] SOUND ATTENUATING STRUCTURE

[75] Inventor: Maurice Ian Taylor, Allestree, England

[73] Assignee: Rolls-Royce (1971) Limited, London, England

[21] Appl. No.: 654,706

[22] Filed: Feb. 2, 1976

[30] Foreign Application Priority Data

Feb. 14, 1975 United Kingdom ............ 06316/75

[51] Int. Cl.[2] ........................................ B32B 3/12

[52] U.S. Cl. ................................ 428/116; 428/73; 428/131; 181/33 HA

[58] Field of Search ............. 428/72, 73, 116, 117, 428/118, 131, 132, 133, 137, 138, 139; 181/33 G, 33 H, 33 HA; 52/618

[56] References Cited

U.S. PATENT DOCUMENTS

| | | | |
|---|---|---|---|
| 1,918,149 | 7/1933 | Sullivan | 428/132 |
| 2,839,442 | 6/1958 | Whitaker | 428/73 X |
| 2,998,337 | 8/1961 | Tillotson | 428/138 X |
| 3,095,943 | 7/1963 | Kemp | 428/73 X |
| 3,301,732 | 1/1967 | Kunz | 156/304 |
| 3,640,357 | 2/1972 | Kitching et al. | 181/33 G |
| 3,769,767 | 11/1973 | Scott | 52/618 X |
| 3,821,999 | 7/1974 | Guess et al. | 428/116 X |
| 3,887,031 | 6/1975 | Wirt | 428/178 X |
| 3,895,152 | 7/1975 | Carlson et al. | 428/116 |
| 3,910,374 | 10/1975 | Holehouse | 428/116 X |
| 3,948,346 | 4/1976 | Schindler | 181/33 G |
| 3,991,849 | 11/1975 | Green et al. | 428/118 X |
| 4,001,473 | 1/1977 | Cook | 428/131 X |

FOREIGN PATENT DOCUMENTS

| | | | |
|---|---|---|---|
| 262,499 | 7/1964 | Australia | 428/118 |
| 1,108,073 | 8/1955 | France | 428/116 |
| 1,279,692 | 6/1972 | United Kingdom | 428/116 |

*Primary Examiner*—George F. Lesmes
*Assistant Examiner*—Henry F. Epstein
*Attorney, Agent, or Firm*—Cushman, Darby & Cushman

[57] ABSTRACT

Use of bulk sound absorber-backed spaced-cell honeycomb structures as sound attenuating liners in the flow ducts of gas turbine engines involves the disadvantage that the bulk absorber may soak up water or fuel present in the honeycomb after entry thereinto from the flow duct. In order to drain away liquid before it comes into contact with the bulk absorber, each honeycomb cell communicates with surrounding cells via apertures in the cell walls through which the liquid can drain, and a perforated sheet is provided between the honeycomb layer and the bulk absorber layer. The perforations are such that sound can enter the bulk absorber layer, but the liquid does not, each perforation being a hole having a peripheral flange which protrudes away from the bulk absorber layer into the interior of a respective cell.

7 Claims, 3 Drawing Figures

SOUND ATTENUATING STRUCTURE

Figure 1:
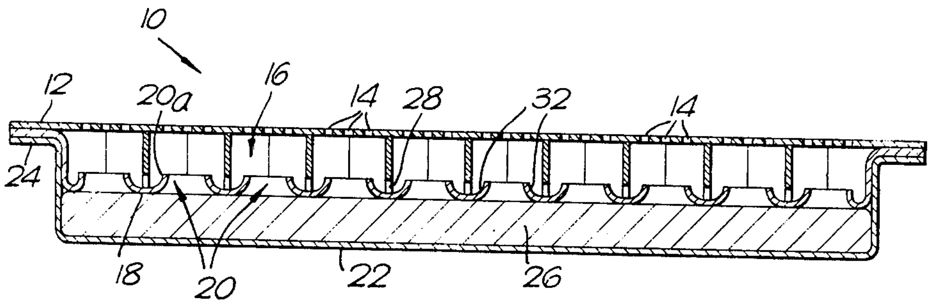

This invention concerns sound attenuating structures particularly for use in gas turbine engine fluid flow ducts, but is not limited to the gas turbine field.

Honeycomb sandwich structures have proved useful for the lining of flow ducts of gas turbine engines of both the ducted fan and turbo-jet types in order to reduce the amount of noise transmitted from the inlets or outlets of the ducts. Sound-attenuating sandwich structures often comprise a space-cel honeycomb layer having one end of each honeycomb cell blocked by a common, blank sheet and the other end of each cell covered by a common perforate sheet. Pressure pulses in the engine enter each cell via the perforate sheet and are dissipated therein, thus reducing the amount of perceptible noise which escapes from the intake or exhaust of the engine.

It is known now that improved sound attenuating characteristics can be achieved by including a layer of bulk sound absorber material in sandwich structures. Bulk absorber materials are generally fibrous in nature, and typically have been used as fillings for acoustic panels, in building for example. However, bulk absorber materials do not possess great mechanical strength and so, in order to withstand the rigours of operation within a gas turbine engine, they must be supported by a sheet metal construction.

When bulk absorbers are used in a honeycomb sandwich structure, one of the sheets of the honeycomb sandwich again must be perforate in order to allow sound to penetrate to the bulk absorbent material. This, however, has the disadvantage that water or fuel or other liquids, depending on the position of the structure within the engine, could seep through the perforate sheet and soak into the fibrous bulk absorber layer, thus creating excess weight, reducing the noise absorbing efficiency of the material, and in the case of fuel, creating a fire hazard.

It is an object of this invention to provide a sound attenuating structure including a bulk absorber, suitable for use in gas turbine engine flow ducts, which structure obviates, or at least reduces the risk of soaking of the bulk absorber material as described hereinbefore.

The present invention provides a sound attenuating sandwich structure incorporating: first and second perforate sheet members, the second sheet member having fewer but larger perforations than the first; a spaced cell honeycomb layer disposed between the first and second sheet members such that a plurality of the perforations in the first sheet member, but only one of the perforations in the second sheet member, communicate with each respective cell in the honeycomb layer; an impervious backing sheet member; and a layer of bulk sound absorber material disposed between the second sheet member and the backing sheet member: wherein the perforations of the second sheet member are holes having a flanged periphery, the flange of each hole extending away from the bulk absorber layer and protruding into the interior of each respective cell in the honeycomb layer, and wherein each cell of the honeycomb layer communicates with a plurality of adjacent cells via apertures in its walls, the apertures being at least partially coextensive with the flanges of respective flanged holes.

Preferably, the impervious backing sheet member retains the bulk sound absorber layer in contact with the second perforate sheet member.

The ends of the impervious backing sheet member may overlap the ends of the bulk absorber layer and may be secured to the ends of the second perforate sheet member.

The sides of each honeycomb cell preferably extend spanwise between first and second sheet members. Each cell communicates with each adjacent cell via at least one aperture in each of its walls.

Liquid which penetrates to the inside of the structure via the first perforated sheet can be drained from the structure by means located at a point in the structure where the liquid collects after drainage through the honeycomb layer via the apertures in the cell wall under the influence of gravity. The bulk absorber layer may comprise a ceramic fibrous material.

Figure 2:
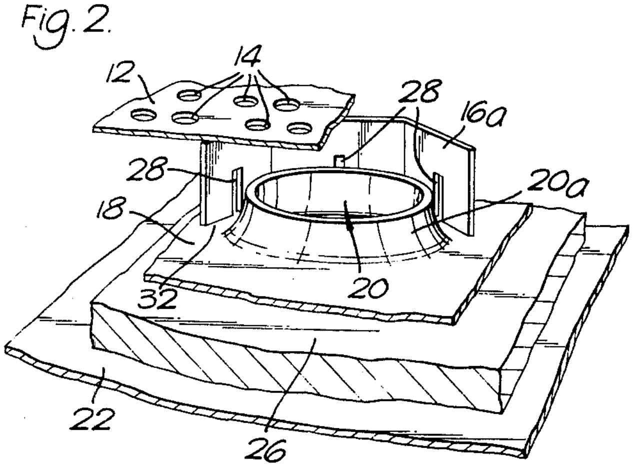
Figure 3:
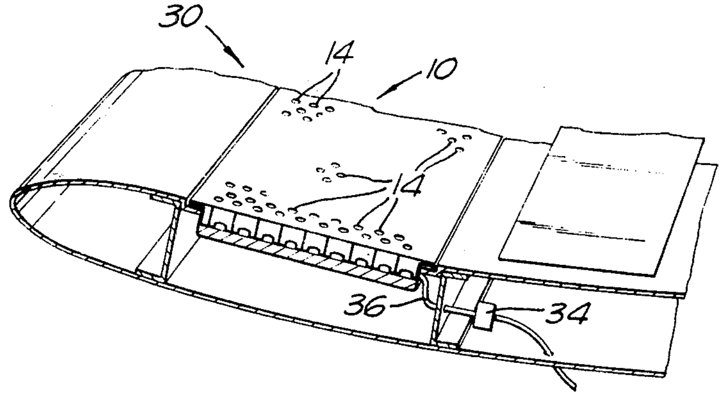

The invention will now be described, by way of example, with reference to the accompanying drawings in which:

FIG. 1 is a cross-sectional view through a sound attenuating structure in accordance with the invention, FIG. 2 is an enlarged broken-away part view in the direction of arrow 2 in FIG. 1, and FIG. 3 is a diagrammatic longitudinal part cross-sectional view of a gas turbine engine air intake.

In FIG. 1, a sound attenuating structure 10 is constructed from a metal sheet 12 which has a great number of small holes 14 in it, a cellular structure 16 in the form of a spaced-cell honeycomb layer and a further metal sheet 18 which has a number of flanged holes 20 in it.

Sheets 12 and 18 are fixed to respective sides of honeycomb layer 16 by brazing or other suitable means.

A further sheet 22 is formed into a flanged box and welded via its flange 24 to the periphery of the remainder of the structure described above.

The proportions of the box structure are such that a space of rectangular cross-section as shown in FIG. 1 is defined between the box structure and sheet 18 and this space is filled with a bulk absorber material 26 such as that sold under the trade mark "SAFFIL", which is a ceramic fibrous material.

FIG. 2 shows more clearly the small diameter of the holes 14 in sheet 12, relative to the diameter of flanged holes 20, the flange itself for each respective hole being indicated by the numeral 20*a*. Further, in FIG. 2, slots 28 can be seen in each cell wall 16*a* as in FIG. 1, which slots ensure communication between all of the cells in honeycomb layer 16 for reasons explained below. In the present example, slots 28 extend to the junction of wall 16*a* with sheet 18, but in practice, the criteria is that they extend below the lips of respective flanges 20*a* as viewed in FIGS. 1 and 2.

In FIG. 3 a gas turbine engine air intake 30 is shown as including a portion made up from structure 10, of which the porous sheet 12 forms the surface exposed to intake air flow and noise emitted from the engine working parts (not shown). The portion is completely annular and pressure pulses (which are heard as noise) from the engine interior pass through the very small perforations 14 into the cells of the honeycomb layer 16 and then pass through the relatively large holes 20 to be dissipated in the bulk absorber layer 26. Holes 20 are made as large as possible having regard to the cross-sectional area of the respective cells, so as to give the maximum exposure of the bulk absorber material to the noise and yet still leave a channel or "moat" 32, best seen in FIGS. 1 ad 2, between the external surface of the roots of flanges 20*a* and the bottoms of cell walls 16*a*.

Rainwater or condensation, if present, will also enter the small perforations 14 but will be reduced to small globules by its passage through perforations 14. Due to surface tension, the rainwater globules will cling to the undersurface of sheet 12 and run down the walls 16*a* of the cells, the gather in channels 32 from whence it can pass from cell to cell via slots 28, to atmosphere via a suction pump 34 and appropriate ducting 36. Thus soaking of the absorber material is avoided, at least to a large extent, and its noise absorbing efficiency maintained.

Where the structure 10 is utilised to form a part of the inner wall of a jet pipe (not shown) and is thus exposed to fuel spillage, the spilled fuel is collected in the manner described with respect to the collection of rainwater, and drained overboard, or returned through a suitable filter system, to the fuel tube.

I claim :

1. A sound attenuating sandwich structure comprising:

- a first perforate sheet member having a plurality of perforations of predetermined size therein;
- a second perforate sheet member spaced from said first perforate sheet member and having a lesser plurality of perforations therein than the plurality of perforations of said first sheet member, each of the perforations of said second sheet member being greater in size than the perforations of said first sheet member, and each of the perforations of said second sheet member being defined by a flanged wall extending toward and terminating short of said first sheet member;
- a spaced cell honeycomb layer disposed between said first and second sheet members, said honeycomb layer having a plurality of walls defining cells of the same, each of said cells of said honeycomb layer being disposed about a plurality of perforations of said first sheet member and only one perforation of said second sheet member, and the walls of each cell defining with said flanged wall of each perforation of said second sheet member a moat extending about the same, and apertures in the walls of each cell for providing communication between adjacent cells, the apertures in the walls of said cells being at least partially coextensive with the moats about the perforations in said second sheet member;
- an impervious backing sheet member spaced from said second sheet member in a direction away from said first sheet member; and
- a layer of bulk sound absorber material disposed between said second sheet member and said impervious backing sheet member.

2. A sound attenuating sandwich structure as claimed in claim 1 in which the impervious backing sheet member retains the bulk sound absorber layer in contact with the second perforate sheet member.

3. A sound attenuating sandwich structure as claimed in claim 1 in which the walls of each cell of the honeycomb layer extend spanwise between the first and second perforate sheet members and wherein each cell communicates with each adjacent cell via at least one aperture in each of its walls.

4. A sound attenuating sandwich structure as claimed in claim 1 including means for removing liquid from the structure which enters the structure through said perforations of the first sheet member and penetrates to the moats around the perforations of said second sheet member, said means comprising ducting connected to said structure for receipt of liquid flowing through said structure from the moats by the apertures in the cell walls of the honeycomb layer.

5. A sound attenuating sandwich structure forming at least a portion of an inner wall of a duct in a gas turbine engine and extending over at least a part of the circumference thereof, said sandwich structure comprising:

- a first perforate sheet member forming at least a portion of the inner surface of said duct, said first perforate sheet member having a plurality of perforations of predetermined size therein;
- a second perforate sheet member coextensive with and spaced radially outwardly from said first sheet member, said second sheet member having a lesser plurality of perforations therein than the plurality of perforations in said first sheet member, each of the perforations of said second sheet member being greater in size than the perforations of said first sheet member, and each of the perforations of said second sheet member being defined by a flanged wall extending radially inwardly toward the center line of said duct and terminating short of said first sheet member;
- a spaced cell honeycomb layer sandwich between said first and second sheet members and bonded thereto, said honeycomb layer having a plurality of walls defining cells of the same, each of said cells of said honeycomb layer extending between said first and second sheet members and being disposed about a plurality of perforations of said first sheet member and only one perforation of said second sheet member, and the walls of each cell defining with said flanged wall of each perforation of said second sheet member a moat extending about the same, and apertures in the walls of each cell for providing communication between adjacent cells, the apertures in the walls of said cells being at least partially coextensive with the moats about the perforations in said second sheet member;
- an impervious backing sheet member spaced from said second sheet member in a direction away from said first sheet member;
- a layer of bulk sound absorber material disposed between said second sheet member and said impervious backing sheet member; and
- means for draining liquid penetrating to the inside of said structure by the perforations of said first sheet member and collecting in said moats, said means being located where liquid collects after drainage by gravity from the moats through the apertures in the walls of the cells of said honeycomb layer.

6. A sound attenuating sandwich structure as claimed in claim 5 in which the ends of the impervious backing sheet member overlap the ends of the bulk absorber layer and are secured to the ends of the second perforate sheet member, thereby to retain the bulk absorber layer in contact with the second perforate sheet member.

7. A sound attenuating sandwich structure as claim 5 in which the bulk absorber layer comprises a ceramic fibrous material.

* * * * *